US011164284B1

(12) United States Patent
Huang (10) Patent No.: US 11,164,284 B1
(45) Date of Patent: Nov. 2, 2021

(54) IMAGE ADJUSTING METHOD

(71) Applicants: BenQ Intelligent Technology (Shanghai) Co., Ltd, Shanghai (CN); BENQ CORPORATION, Taipei (TW)

(72) Inventor: Chih-Pen Huang, New Taipei (TW)

(73) Assignees: BenQ Intelligent Technology (Shanghai) Co., Ltd, Shanghai (CN); BENQ CORPORATION, Taipei (TW)

( * ) Notice: Subject to any disclaimer, the term of this patent is extended or adjusted under 35 U.S.C. 154(b) by 0 days.

(21) Appl. No.: 17/093,641

(22) Filed: Nov. 10, 2020

(30) Foreign Application Priority Data

Jun. 15, 2020 (CN) .......................... 202010544053.5

(51) Int. Cl.
*G06T 3/00* (2006.01)
*G06T 3/40* (2006.01)

(52) U.S. Cl.
CPC .......... *G06T 3/0093* (2013.01); *G06T 3/4007* (2013.01)

(58) Field of Classification Search
CPC ............................ G06T 3/0093; G06T 3/4007
See application file for complete search history.

(56) References Cited

U.S. PATENT DOCUMENTS

| 9,325,899 B1* | 4/2016 | Chou | ...................... H04N 5/247 |
| 2009/0268987 A1* | 10/2009 | Tsuda | ...................... G06T 13/80 |
| | | | 382/305 |
| 2016/0314610 A1* | 10/2016 | Lee | ......................... G06T 13/80 |
| | | | 382/305 |

* cited by examiner

*Primary Examiner* — Matthew Salvucci
(74) *Attorney, Agent, or Firm* — Winston Hsu (57) ABSTRACT

An image adjusting method includes steps of displaying an image, wherein the image includes M*N original pixels and M and N are positive integers larger than 2; simplifying the M*N original pixels to be P*Q simplified pixels, wherein P is a positive integer smaller than M and larger than 1, and Q is a positive integer smaller than N and larger than 1; setting an initial pixel and a target pixel within the P*Q simplified pixels; finding a plurality of intermediate pixels between the initial pixel and the target pixel; and adjusting the initial pixel, the intermediate pixels and the target pixel pixel by pixel.

5 Claims, 7 Drawing Sheets

IMAGE ADJUSTING METHOD

BACKGROUND OF THE INVENTION

1. Field of the Invention

The invention relates to an image adjusting method and, more particularly, to an image adjusting method capable of rapidly performing an image warping process.

2. Description of the Prior Art

Figure 1:
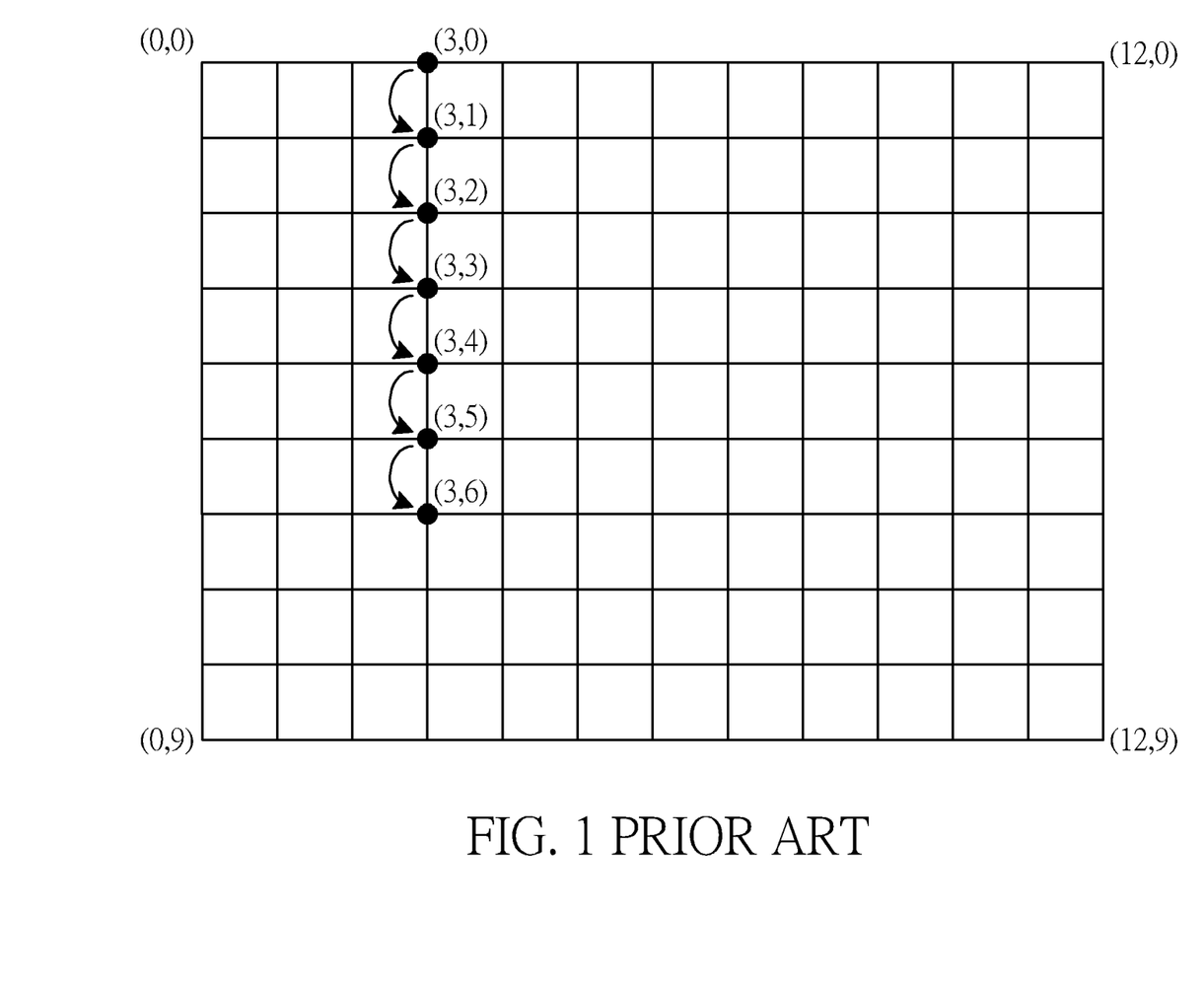
FIG. 1 is a schematic view illustrating an image consisting of 13*10 pixels.

Image warping process is an image adjusting process for correcting image distortion or deforming an image to generate a specific visual effect. Referring to FIG. 1, FIG. 1 is a schematic view illustrating an image consisting of 13*10 pixels. As shown in FIG. 1, when a user wants to perform an image warping process for the pixels (3,0) to (3,6) within the image, the user has to move the pixel (3,0) to the pixel (3,6) step by step. For further explanation, the user has to sequentially move the pixel (3,0) to the pixel (3,1), move the pixel (3,1) to the pixel (3,2), move the pixel (3,2) to the pixel (3,3), move the pixel (3,3) to the pixel (3,4), move the pixel (3,4) to the pixel (3,5), and move the pixel (3,5) to the pixel (3,6). In other words, the user has to perform six adjusting steps to complete the image warping process for the pixels (3,0) to (3,6). When the user wants to perform the image warping process for more pixels, the number of adjusting steps will increase correspondingly. Therefore, the aforesaid adjustment is quite inconvenient and inefficient to the user. Furthermore, the aforesaid adjustment is linear, such that the adjusted image is not smooth.

SUMMARY OF THE INVENTION

The invention provides an image adjusting method capable of rapidly performing an image warping process, so as to solve the aforesaid problems.

According to an embodiment of the invention, an image adjusting method comprising steps of displaying an image, wherein the image comprises M*N original pixels and M and N are positive integers larger than 2; simplifying the M*N original pixels to be P*Q simplified pixels, wherein P is a positive integer smaller than M and larger than 1; Q is a positive integer smaller than N and larger than 1; setting an initial pixel and a target pixel within the P*Q simplified pixels; finding a plurality of intermediate pixels between the initial pixel and the target pixel; and adjusting the initial pixel, the intermediate pixels and the target pixel pixel by pixel.

As mentioned in the above, the invention simplifies a more number of original pixels within the image to be a less number of simplified pixels. Accordingly, a user only needs to set the initial pixel and the target pixel within the simplified pixels. Then the invention will automatically find the intermediate pixels between the initial pixel and the target pixel and adjust the initial pixel, the intermediate pixels and the target pixel pixel by pixel, so as to automatically complete an image warping process from the initial pixel to the target pixel. Therefore, the invention can simplify adjusting steps for the user, such that the user can rapidly perform the image warping process.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
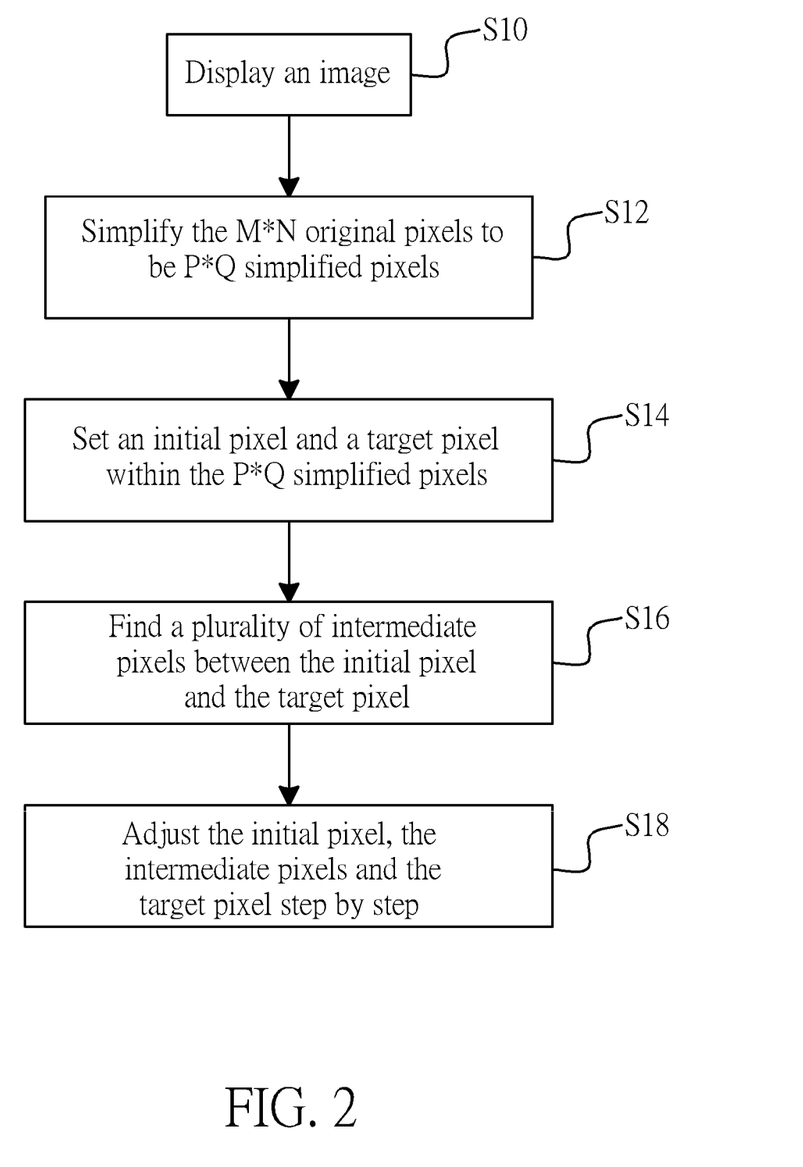
FIG. 2 is a flowchart illustrating an image adjusting method according to an embodiment of the invention.
Figure 3:
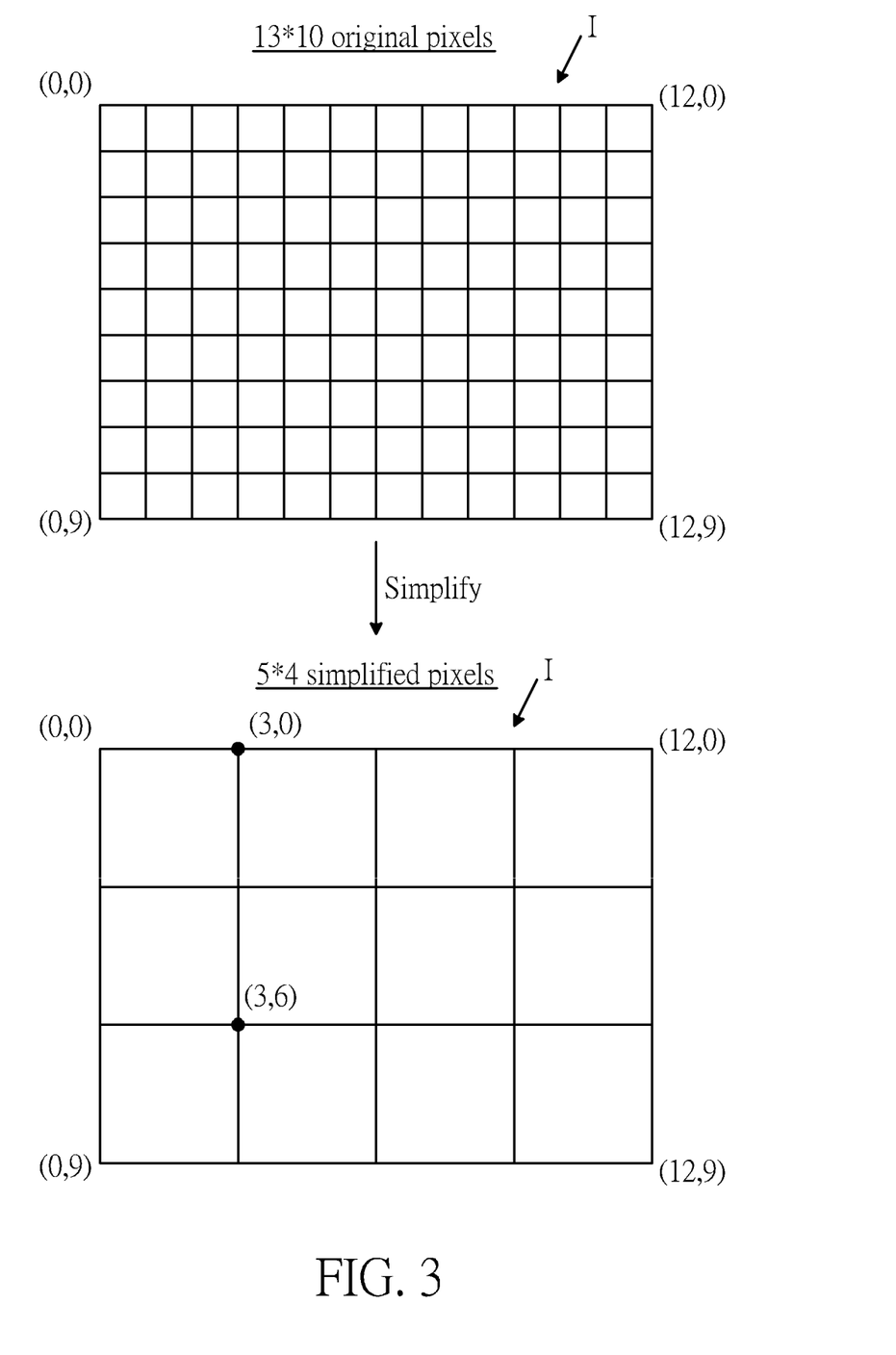
FIG. 3 is a schematic view illustrating 13*10 original pixels being simplified to be 5*4 pixels.
Figure 4:
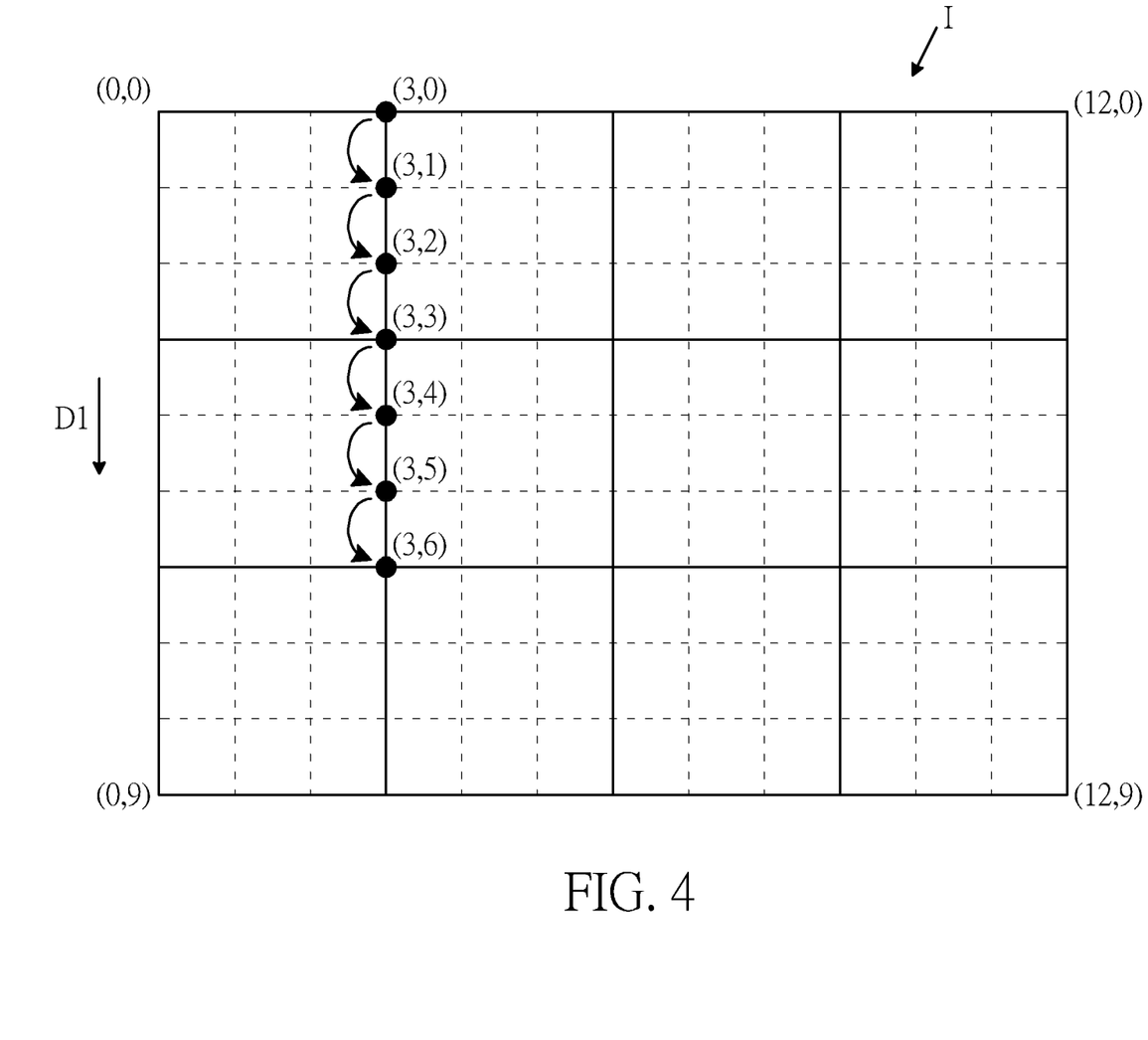
FIG. 4 is a schematic view illustrating the initial pixel, the intermediate pixels and the target pixel.

Referring to FIGS. 2 to 4, FIG. 2 is a flowchart illustrating an image adjusting method according to an embodiment of the invention, FIG. 3 is a schematic view illustrating 13*10 original pixels being simplified to be 5*4 pixels, and FIG. 4 is a schematic view illustrating the initial pixel, the intermediate pixels and the target pixel.

The image adjusting method shown in FIG. 2 can be used to perform an image warping process for an image I shown in FIG. 3. In practical applications, a user may utilize a display device (e.g. projector, monitor, etc.) to display an image I (step S10 in FIG. 2). As shown in FIG. 3, the image I comprises M*N original pixels, wherein M and N are positive integers larger than 2. In this embodiment, the image I may comprise 13*10 original pixels (i.e. M=13 and N=10). It should be noted that the number of original pixels of the image is determined according to a real size of the image, so the invention is not limited to the embodiment shown in the figure.

Then, the invention simplifies the M*N original pixels to be P*Q simplified pixels (step S12 in FIG. 2), wherein P is a positive integer smaller than M and larger than 1, and Q is a positive integer smaller than N and larger than 1. In this embodiment, 13*10 original pixels may be simplified to be 5*4 simplified pixels (i.e. P=5 and Q=4), as shown in FIG. 3. Furthermore, the invention may provide a user interface (not shown) for the user to set the number of simplified pixels. Needless to say, the number of simplified pixels may also be system default.

Then, the user may set an initial pixel and a target pixel within the P*Q simplified pixels (step S14 in FIG. 2). For example, if the user wants to perform the image warping process for the pixels (3,0) to (3,6) within the image I, the user may set (3,0) to be the initial pixel and set (3,6) to be the target pixel, as shown in FIG. 3. In this embodiment, the initial pixel and the target pixel may be set by the aforesaid user interface. Needless to say, the user may also use an input device (e.g. mouse) to set the initial pixel and the target pixel within the image I directly.

After setting the initial pixel and the target pixel, the invention will automatically find a plurality of intermediate pixels between the initial pixel and the target pixel (step S16 in FIG. 2). In this embodiment, the invention may find the intermediate pixels between the initial pixel and the target pixel by interpolation. For further explanation, it is assumed that the initial pixel is (x0,y0) and the target pixel is (x1,y1). After setting the initial pixel and the target pixel, the invention may determine an adjusting direction from the initial pixel to the target pixel first. In this embodiment, the invention may determine the adjusting direction according to (|x1-x0|,|y1-y0|). When |x1-x0|>0 and |y1-y0|>0, the adjusting direction from the initial pixel to the target pixel is an inclined direction within the image I. When |x1-x0|=0 and |y1-y0|>0, the adjusting direction from the initial pixel to the target pixel is a vertical direction within the image I. When |x1-x0|>0 and |y1-y0|=0, the adjusting direction from the initial pixel to the target pixel is a horizontal direction within the image I. In this embodiment, the initial pixel is (3,0) and the target pixel is (3,6). Accordingly, |x1-x0|=0 and |y1-y0|>0. The adjusting direction D1 from the initial pixel (3,0) to the target pixel (3,6) is a vertical direction within the image I, as shown in FIG. 4.

Then, the invention may find the intermediate pixels between the initial pixel and the target pixel along the adjusting direction D1. In this embodiment, the initial pixel is (3,0) and the target pixel is (3,6). Accordingly, |x1-x0|=0 and |y1-y0|=6. At this time, the intermediate pixels are represented by (x0,y0+t), wherein t∈1-5. Accordingly, as shown in FIG. 4, five intermediate pixels between the initial pixel (3,0) and the target pixel (3,6) are (3,1), (3,2), (3,3), (3,4) and (3,5).

Then, the invention automatically adjusts the initial pixel (3,0), the intermediate pixels (3,1), (3,2), (3,3), (3,4), (3,5) and the target pixel (3,6) pixel by pixel along the adjusting direction D1 (step S18 in FIG. 2). In this embodiment, the invention may sequentially move the pixel (3,0) to the pixel (3,1), move the pixel (3,1) to the pixel (3,2), move the pixel (3,2) to the pixel (3,3), move the pixel (3,3) to the pixel (3,4), move the pixel (3,4) to the pixel (3,5), and move the pixel (3,5) to the pixel (3,6) along the adjusting direction D1. When the pixel (3,0) is moved to the pixel (3,1), the invention may re-encode and encapsulate RGB pixel values of the pixels (3,0) and (3,1) on the pixel (3,1) and set RGB pixel values of the pixel (3,0) to be 0. When the pixel (3,1) is moved to the pixel (3,2), the invention may re-encode and encapsulate RGB pixel values of the pixels (3,1) and (3,2) on the pixel (3,2) and set RGB pixel values of the pixel (3,1) to be 0. It should be noted that other pixels may also be adjusted according to the aforesaid manner, so the repeated explanation will not be depicted herein. Furthermore, how to re-encode and encapsulate RGB pixel values is well known by one skilled in the art, so the repeated explanation will not be depicted herein either.

Therefore, after the user sets the initial pixel (3,0) and the target pixel (3,6) within the simplified pixels, the invention will automatically complete the image warping process from the initial pixel (3,0) to the target pixel (3,6). Accordingly, the invention can simplify adjusting steps for the user, such that the user can rapidly perform the image warping process.

While performing the image warping process from the initial pixel (3,0) to the target pixel (3,6), the invention may further perform the image warping process for a plurality of neighboring pixels neighboring the intermediate pixels (3,1), (3,2), (3,3), (3,4), (3,5) and the initial pixel (3,0), so as to make the adjusted image smoother.

Figure 5:
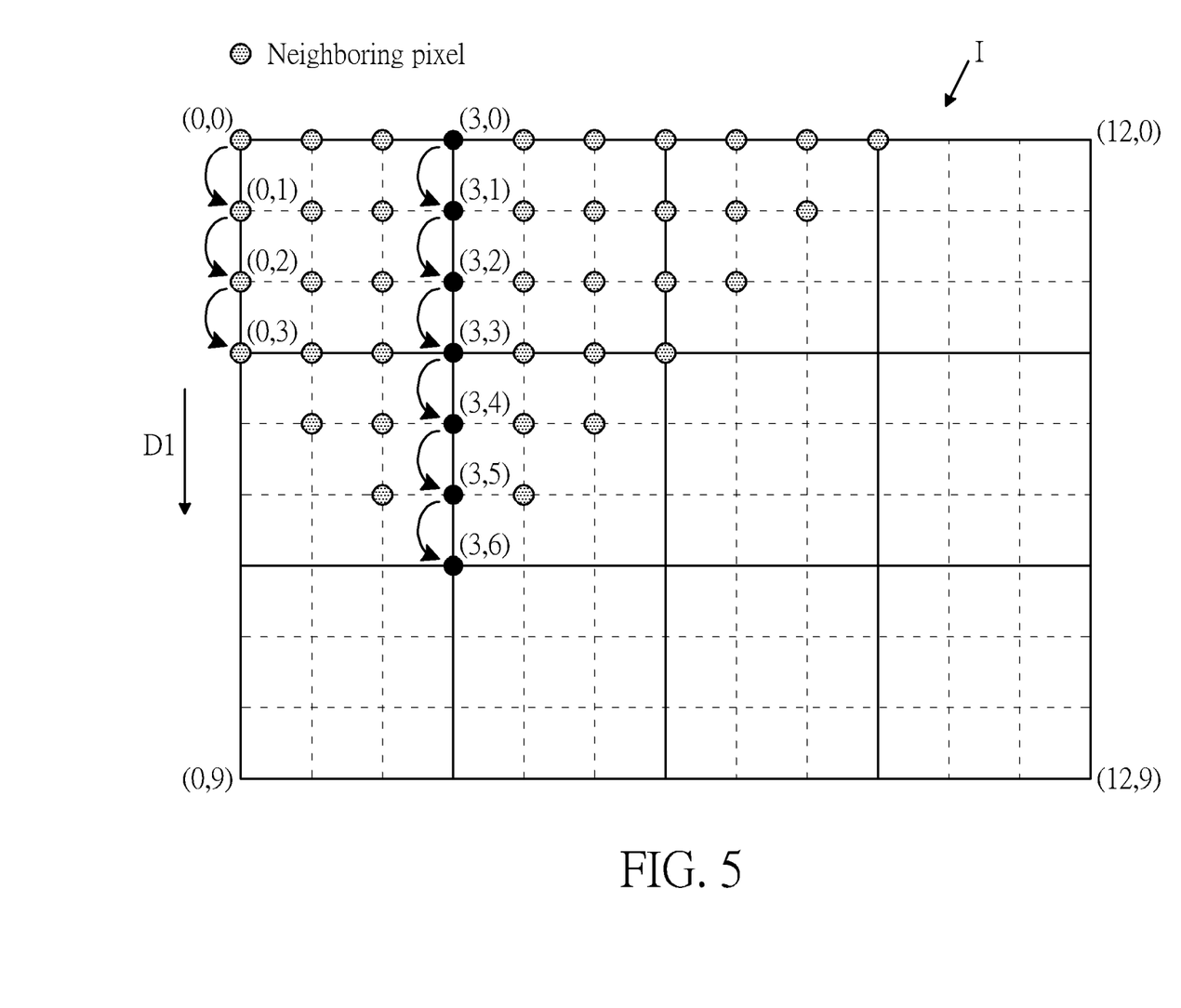
FIG. 5 is a schematic view illustrating the neighboring pixels neighboring the intermediate pixels and the initial pixel.

Referring to FIG. 5, FIG. 5 is a schematic view illustrating the neighboring pixels neighboring the intermediate pixels and the initial pixel. The invention may calculate a plurality of relative lengths between the initial pixel, the intermediate pixels and the target pixel first and then define a plurality of weights for the intermediate pixels and the initial pixel according to the relative lengths. As shown in FIG. 5, the initial pixel is (3,0), the target pixel is (3,6), and the intermediate pixels are (3,1), (3,2), (3,3), (3,4), (3,5). Accordingly, the relative length between the intermediate pixel (3,5) and the target pixel (3,6) is 1, the relative length between the intermediate pixel (3,4) and the target pixel (3,6) is 2, the relative length between the intermediate pixel (3,3) and the target pixel (3,6) is 3, the relative length between the intermediate pixel (3,2) and the target pixel (3,6) is 4, the relative length between the intermediate pixel (3,1) and the target pixel (3,6) is 5, and the relative length between the initial pixel (3,0) and the target pixel (3,6) is 6. At this time, the weight of the intermediate pixel (3,5) may be set to be 1, the weight of the intermediate pixel (3,4) may be set to be 2, the weight of the intermediate pixel (3,3) may be set to be 3, the weight of the intermediate pixel (3,2) may be set to be 4, the weight of the intermediate pixel (3,1) may be set to be 5, and the weight of the initial pixel (3,0) may be set to be 6.

Then, the invention may find a plurality of neighboring pixels neighboring the intermediate pixels (3, 1), (3, 2), (3, 3), (3, 4), (3, 5) and the initial pixel (3, 0) according to the weights and the adjusting direction D1 mentioned in the above. When the adjusting direction D1 is a vertical direction within the image I, the neighboring pixels may be located on a horizontal direction of the intermediate pixels (3,1), (3,2), (3,3), (3,4), (3,5) and the initial pixel (3,0). In this embodiment, the weight of the intermediate pixel (3,5) is 1. Thus, the invention may find one neighboring pixel on the horizontal direction for each of opposite sides of the intermediate pixel (3,5). At this time, the neighboring pixels neighboring the intermediate pixel (3,5) are (2,5) and (4,5). In this embodiment, the weight of the intermediate pixel (3,4) is 2. Thus, the invention may find two neighboring pixels on the horizontal direction for each of opposite sides of the intermediate pixel (3,4). At this time, the neighboring pixels neighboring the intermediate pixel (3,4) are (1,4), (2,4), (4,4) and (5,4). It should be noted that the neighboring pixels neighboring the intermediate pixels (3,3), (3,2), (3,1) and the initial pixel (3, 0) may also be found according to the aforesaid manner, so the repeated explanation will not be depicted herein. Still further, a range of searching the neighboring pixels is based on a boundary of the image. When the number of pixels between the boundary of the image and the intermediate pixel/initial pixel is smaller than the weight, all of the pixels between the boundary of the image and the intermediate pixel/initial pixel are taken to be the neighboring pixels.

It should be noted that when the aforesaid adjusting direction is a horizontal direction within the image I (i.e. the intermediate pixels and the initial pixel are arranged along the horizontal direction within the image I), the neighboring pixels are located on a vertical direction of the intermediate pixels and the initial pixel.

Then, the invention may automatically adjust the neighboring pixels pixel by pixel along the adjusting direction D1, so as to make the adjusted image smoother. For example, the pixels (0,0), (0,1), (0,2), (0,3) are four neighboring pixels along the adjusting direction D1. Thus, the invention may sequentially move the pixel (0,0) to the pixel (0,1), move the pixel (0,1) to the pixel (0,2), and move the pixel (0,2) to the pixel (0,3) along the adjusting direction D1. When the pixel (0,0) is moved to the pixel (0,1), the invention may re-encode and encapsulate RGB pixel values of the pixels (0,0) and (0,1) on the pixel (0,1) and set RGB pixel values of the pixel (0,0) to be 0. When the pixel (0,1) is moved to the pixel (0,2), the invention may re-encode and encapsulate RGB pixel values of the pixels (0,1) and (0,2) on the pixel (0,2) and set RGB pixel values of the pixel (0,1) to be 0. It should be noted that other pixels may also be adjusted according to the aforesaid manner, so the repeated explanation will not be depicted herein. Furthermore, how to re-encode and encapsulate RGB pixel values is well known by one skilled in the art, so the repeated explanation will not be depicted herein either.

Therefore, after the user sets the initial pixel (3,0) and the target pixel (3,6) within the simplified pixels, the invention will automatically complete the image warping process from the initial pixel (3,0) to the target pixel (3,6) and automatically complete the image warping process for the neighboring pixels. Accordingly, the adjusted image will be smoother.

Figure 6:
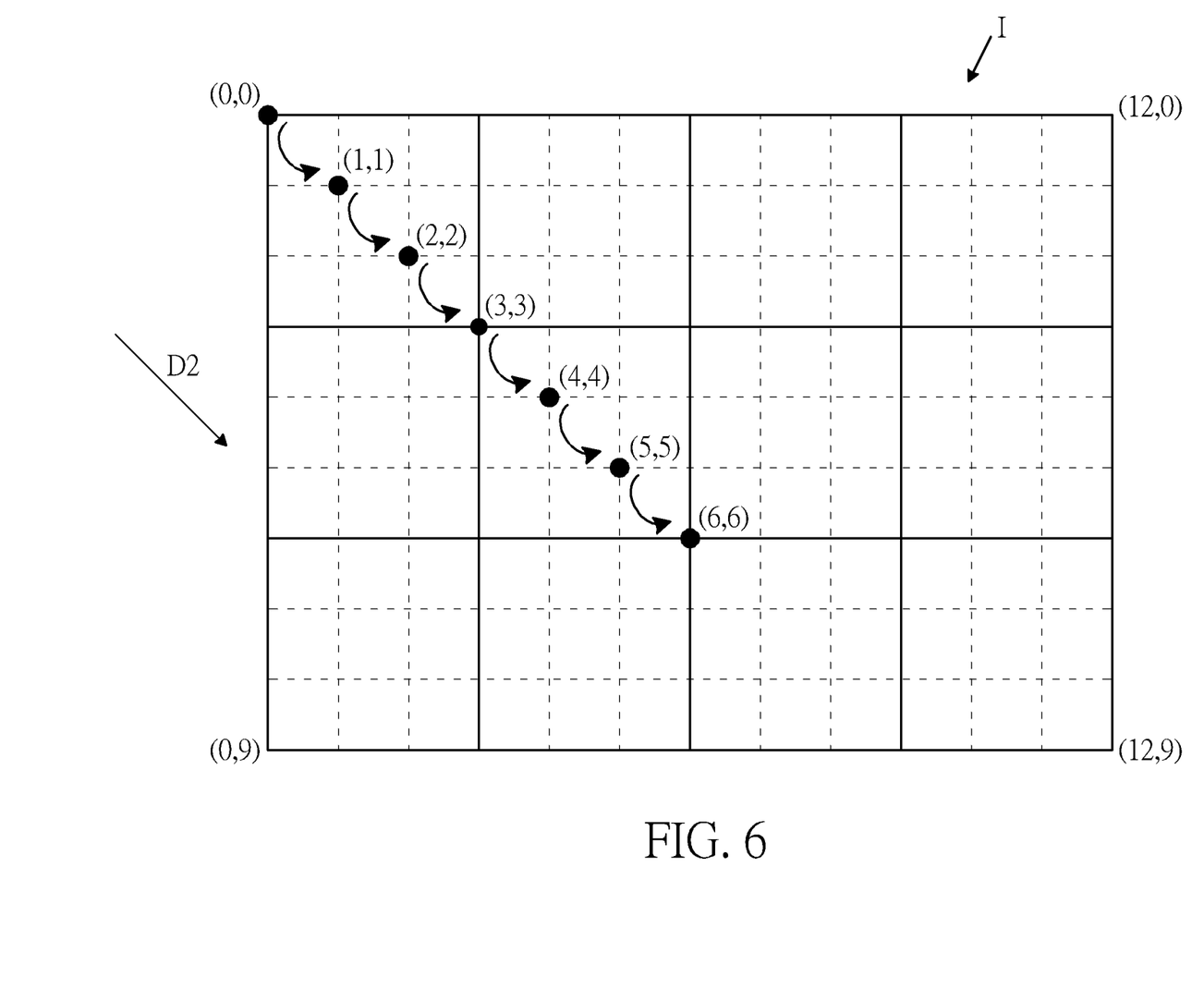
FIG. 6 is another schematic view illustrating the initial pixel, the intermediate pixels and the target pixel.

Referring to FIG. 6, FIG. 6 is another schematic view illustrating the initial pixel, the intermediate pixels and the target pixel. If the user wants to perform the image warping process for the pixels (0,0) to (6,6) within the image I, the user may set the initial pixel to be (0,0) and set the target pixel to be (6,6), as shown in FIG. 6.

After setting the initial pixel and the target pixel (step S14 in FIG. 2), the invention will automatically find a plurality of intermediate pixels between the initial pixel and the target pixel (step S16 in FIG. 2). As mentioned in the above, the invention may find the intermediate pixels between the initial pixel and the target pixel by interpolation. It is assumed that the initial pixel is (x0,y0) and the target pixel is (x1,y1). After setting the initial pixel and the target pixel, the invention may determine an adjusting direction from the initial pixel to the target pixel according to (|x1-x0|, |y1-y0|). When |x1-x0|>0 and |y1-y0|>0, the adjusting direction from the initial pixel to the target pixel is an inclined direction within the image I. In this embodiment, the initial pixel is (0,0) and the target pixel is (6,6). Accordingly, |x1-x0|>0 and |y1-y0|>0. The adjusting direction D2 from the initial pixel (0,0) to the target pixel (6,6) is an inclined direction within the image I, as shown in FIG. 6.

Then, the invention may find the intermediate pixels between the initial pixel and the target pixel along the adjusting direction D2. In this embodiment, the initial pixel is (0,0) and the target pixel is (6,6). Accordingly, |x1-x0|=6 and |y1-y0|=6. At this time, the intermediate pixels are represented by (x0+t,y0+t), wherein t∈1-5. Accordingly, as shown in FIG. 6, five intermediate pixels between the initial pixel (0,0) and the target pixel (6,6) are (1,1), (2,2), (3,3), (4,4) and (5,5).

Then, the invention automatically adjusts the initial pixel (0,0), the intermediate pixels (1,1), (2,2), (3,3), (4,4), (5,5) and the target pixel (6,6) pixel by pixel along the adjusting direction D2 (step S18 in FIG. 2). In this embodiment, the invention may sequentially move the pixel (0,0) to the pixel (1,1), move the pixel (1,1) to the pixel (2,2), move the pixel (2,2) to the pixel (3,3), move the pixel (3,3) to the pixel (4,4), move the pixel (4,4) to the pixel (5,5), and move the pixel (5,5) to the pixel (6,6) along the adjusting direction D2. When the pixel (0,0) is moved to the pixel (1,1), the invention may re-encode and encapsulate RGB pixel values of the pixels (0,0) and (1,1) on the pixel (1,1) and set RGB pixel values of the pixel (0,0) to be 0. When the pixel (1,1) is moved to the pixel (2,2), the invention may re-encode and encapsulate RGB pixel values of the pixels (1,1) and (2,2) on the pixel (2,2) and set RGB pixel values of the pixel (1,1) to be 0. It should be noted that other pixels may also be adjusted according to the aforesaid manner, so the repeated explanation will not be depicted herein. Furthermore, how to re-encode and encapsulate RGB pixel values is well known by one skilled in the art, so the repeated explanation will not be depicted herein either.

Therefore, after the user sets the initial pixel (0,0) and the target pixel (6,6) within the simplified pixels, the invention will automatically complete the image warping process from the initial pixel (0,0) to the target pixel (6,6). Accordingly, the invention can simplify adjusting steps for the user, such that the user can rapidly perform the image warping process.

While performing the image warping process from the initial pixel (0,0) to the target pixel (6,6), the invention may further perform the image warping process for a plurality of neighboring pixels neighboring the intermediate pixels (1,1), (2,2), (3,3), (4,4), (5,5) and the initial pixel (0,0), so as to make the adjusted image smoother.

Figure 7:
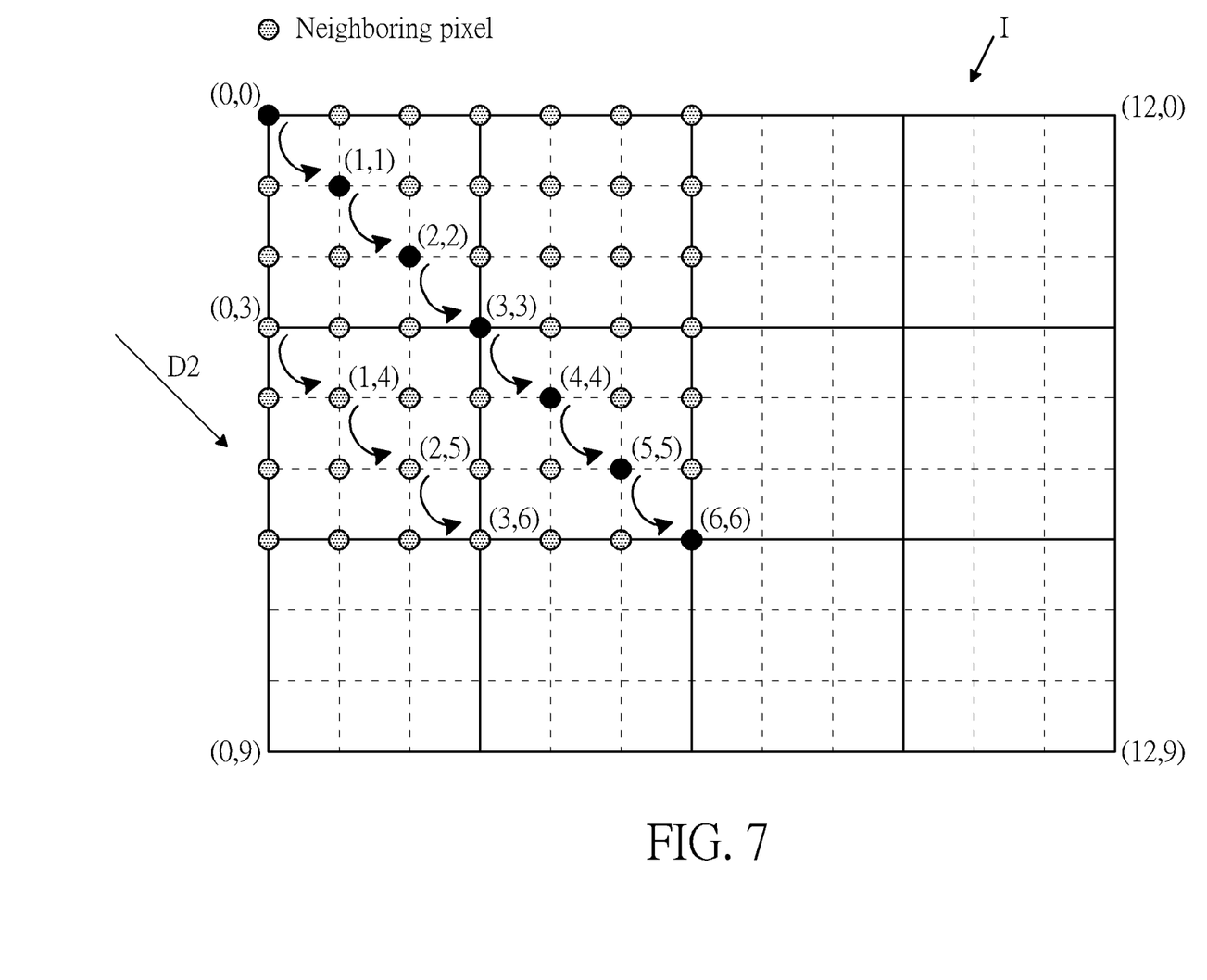
FIG. 7 is another schematic view illustrating the neighboring pixels neighboring the intermediate pixels and the initial pixel.

Referring to FIG. 7, FIG. 7 is another schematic view illustrating the neighboring pixels neighboring the intermediate pixels and the initial pixel. As mentioned in the above, the invention may calculate a plurality of relative lengths between the initial pixel, the intermediate pixels and the target pixel first and then define a plurality of weights for the intermediate pixels and the initial pixel according to the relative lengths. As shown in FIG. 7, the initial pixel is (0,0), the target pixel is (6,6), and the intermediate pixels are (1,1), (2,2), (3,3), (4,4), (5,5). Accordingly, the relative length between the intermediate pixel (5,5) and the target pixel (6,6) is $\sqrt{2}$, the relative length between the intermediate pixel (4,4) and the target pixel (6,6) is $2\sqrt{2}$, the relative length between the intermediate pixel (3,3) and the target pixel (6, 6) is $3\sqrt{2}$, the relative length between the intermediate pixel (2, 2) and the target pixel (6, 6) is $4\sqrt{2}$, the relative length between the intermediate pixel (1,1) and the target pixel (6,6) is $5\sqrt{2}$, and the relative length between the initial pixel (0,0) and the target pixel (6, 6) is $6\sqrt{2}$. At this time, the invention may divide the relative length by $\sqrt{2}$ to set the weight. Accordingly, the weight of the intermediate pixel (5,5) may be set to be 1 ($\sqrt{2}/\sqrt{2}$), the weight of the intermediate pixel (4, 4) may be set to be 2 ($2\sqrt{2}/\sqrt{2}$), the weight of the intermediate pixel (3, 3) may be set to be 3 ($3\sqrt{2}/\sqrt{2}$), the weight of the intermediate pixel (2, 2) may be set to be 4 ($4\sqrt{2}/\sqrt{2}$), the weight of the intermediate pixel (1,1) may be set to be 5 ($5\sqrt{2}/\sqrt{2}$), and the weight of the initial pixel (0, 0) may be set to be 6 ($6\sqrt{2}/\sqrt{2}$).

Then, the invention may find a plurality of neighboring pixels neighboring the intermediate pixels (1, 1), (2, 2), (3, 3), (4, 4), (5, 5) and the initial pixel (0, 0) according to the weights and the adjusting direction D2 mentioned in the above. When the adjusting direction D2 is an inclined direction within the image I, the neighboring pixels may be located on a horizontal direction and a vertical direction of the intermediate pixels (1,1), (2,2), (3,3), (4,4), (5,5) and the initial pixel (0, 0). In this embodiment, the weight of the intermediate pixel (5,5) is 1. Thus, the invention may find one neighboring pixel on each of the horizontal direction and the vertical direction for the intermediate pixel (5,5). At this time, the neighboring pixels neighboring the intermediate pixel (5,5) are (6,5) and (5, 6). In this embodiment, the weight of the intermediate pixel (4,4) is 2. Thus, the invention may find two neighboring pixels on each of the horizontal direction and the vertical direction for the intermediate pixel (4,4). At this time, the neighboring pixels neighboring the intermediate pixel (4,4) are (5,4), (6,4), (4,5) and (4,6). It should be noted that the neighboring pixels neighboring the intermediate pixels (1,1), (2,2), (3,3) and the initial pixel (0,0) may also be found according to the aforesaid manner, so the repeated explanation will not be depicted herein.

Then, the invention may automatically adjust the neighboring pixels pixel by pixel along the adjusting direction D2, so as to make the adjusted image smoother. For example, the pixels (0,3), (1,4), (2,5), (3,6) are four neighboring pixels along the adjusting direction D2. Thus, the invention may sequentially move the pixel (0,3) to the pixel (1,4), move the pixel (1,4) to the pixel (2,5), and move the pixel (2,5) to the pixel (3,6) along the adjusting direction D2. When the pixel (0,3) is moved to the pixel (1,4), the invention may re-encode and encapsulate RGB pixel values of the pixels (0,3) and (1,4) on the pixel (1,4) and set RGB pixel values of the pixel (0,3) to be 0. When the pixel (1,4) is moved to the pixel (2,5), the invention may re-encode and encapsulate RGB pixel values of the pixels (1,4) and (2,5) on the pixel (2,5) and set RGB pixel values of the pixel (1,4) to be 0. It should be noted that other pixels may also be adjusted according to the aforesaid manner, so the repeated explanation will not be depicted herein. Furthermore, how to re-encode and encapsulate RGB pixel values is well known by one skilled in the art, so the repeated explanation will not be depicted herein either.

Therefore, after the user sets the initial pixel (0,0) and the target pixel (6,6) within the simplified pixels, the invention will automatically complete the image warping process from the initial pixel (0,0) to the target pixel (6,6) and automatically complete the image warping process for the neighboring pixels. Accordingly, the adjusted image will be smoother.

It should be noted that each part or function of the control logic of the image adjusting method of the invention may be implemented by a combination of software and hardware.

As mentioned in the above, the invention simplifies a more number of original pixels within the image to be a less number of simplified pixels. Accordingly, a user only needs to set the initial pixel and the target pixel within the simplified pixels. Then the invention will automatically find the intermediate pixels between the initial pixel and the target pixel and adjust the initial pixel, the intermediate pixels and the target pixel pixel by pixel, so as to automatically complete an image warping process from the initial pixel to the target pixel. Therefore, the invention can simplify adjusting steps for the user, such that the user can rapidly perform the image warping process. Moreover, while performing the image warping process from the initial pixel to the target pixel, the invention may further perform the image warping process for a plurality of neighboring pixels neighboring the intermediate pixels and the initial pixel, so as to make the adjusted image smoother.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image adjusting method comprising:
    displaying an image, wherein the image comprises M*N original pixels and M and N are positive integers larger than 2;
    simplifying the M*N original pixels to be P*Q simplified pixels, wherein P is a positive integer smaller than M and larger than 1, and Q is a positive integer smaller than N and larger than 1;
    setting an initial pixel and a target pixel within the P*Q simplified pixels;
    finding a plurality of intermediate pixels between the initial pixel and the target pixel;
    adjusting the initial pixel, the intermediate pixels and the target pixel pixel by pixel;
    after setting the initial pixel and the target pixel, determining an adjusting direction from the initial pixel to the target pixel, wherein the image adjusting method finds the intermediate pixels between the initial pixel and the target pixel along the adjusting direction and the image adjusting method adjusts the initial pixel, the intermediate pixels and the target pixel pixel by pixel along the adjusting direction;
    calculating a plurality of relative lengths between the initial pixel, the intermediate pixels and the target pixel;
    defining a plurality of weights for the intermediate pixels and the initial pixel according to the relative lengths;
    finding a plurality of neighboring pixels neighboring the intermediate pixels and the initial pixel according to the weights and the adjusting direction; and
    adjusting the neighboring pixels pixel by pixel along the adjusting direction.

2. The image adjusting method of claim 1, wherein when the adjusting direction is a vertical direction within the image, the neighboring pixels are located on a horizontal direction of the intermediate pixels and the initial pixel.

3. The image adjusting method of claim 1, wherein when the adjusting direction is a horizontal direction within the image, the neighboring pixels are located on a vertical direction of the intermediate pixels and the initial pixel.

4. The image adjusting method of claim 1, wherein when the adjusting direction is an inclined direction within the image, the neighboring pixels are located on a horizontal direction and a vertical direction of the intermediate pixels and the initial pixel.

5. The image adjusting method of claim 1, wherein the image adjusting method finds the intermediate pixels by interpolation.

\* \* \* \* \*